Dec. 7, 1926.

M. J. B. BARBAROU 1,609,284

STARTING APPARATUS FOR INTERNAL COMBUSTION ENGINES

Filed Nov. 7, 1921    4 Sheets-Sheet 1

INVENTOR
Marius Jean Baptiste Barbarou

By
his ATTORNEY.

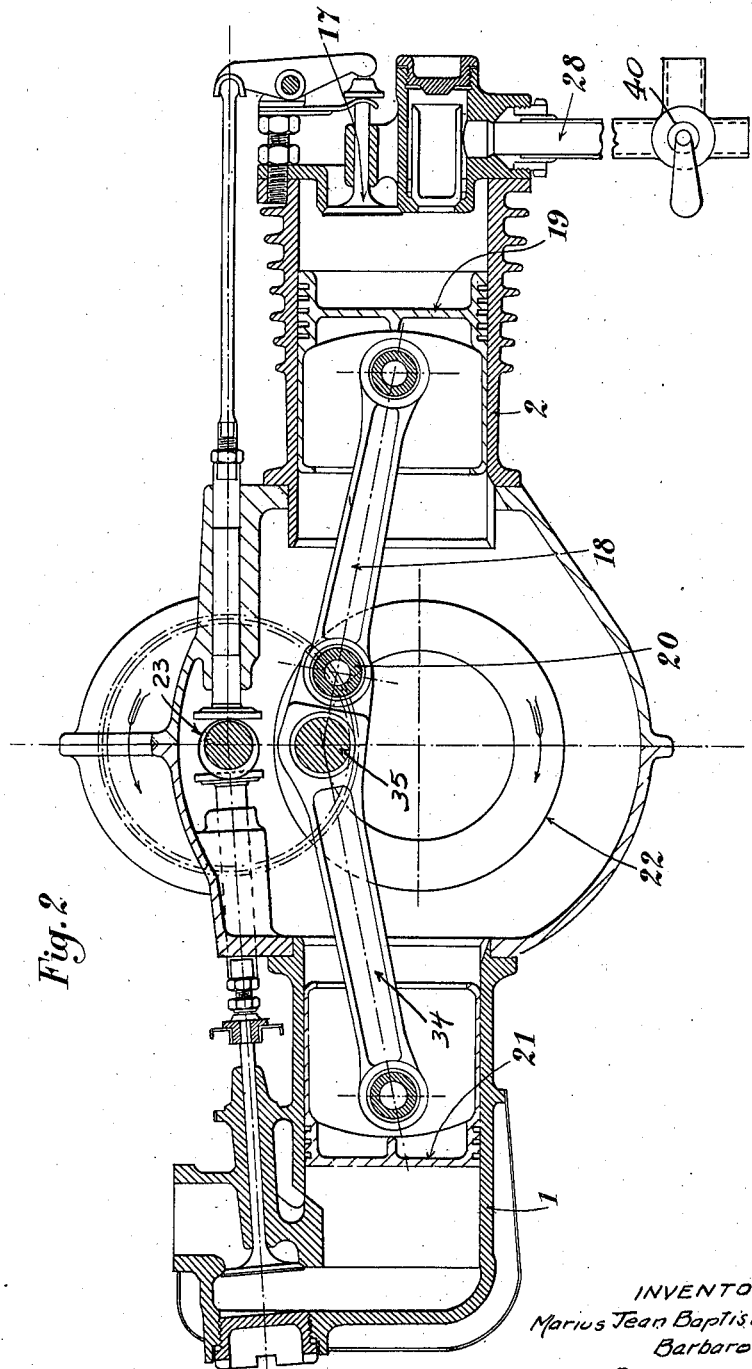

Dec. 7, 1926.  
M. J. B. BARBAROU  
1,609,284
STARTING APPARATUS FOR INTERNAL COMBUSTION ENGINES.
Filed Nov. 7, 1921    4 Sheets-Sheet 3
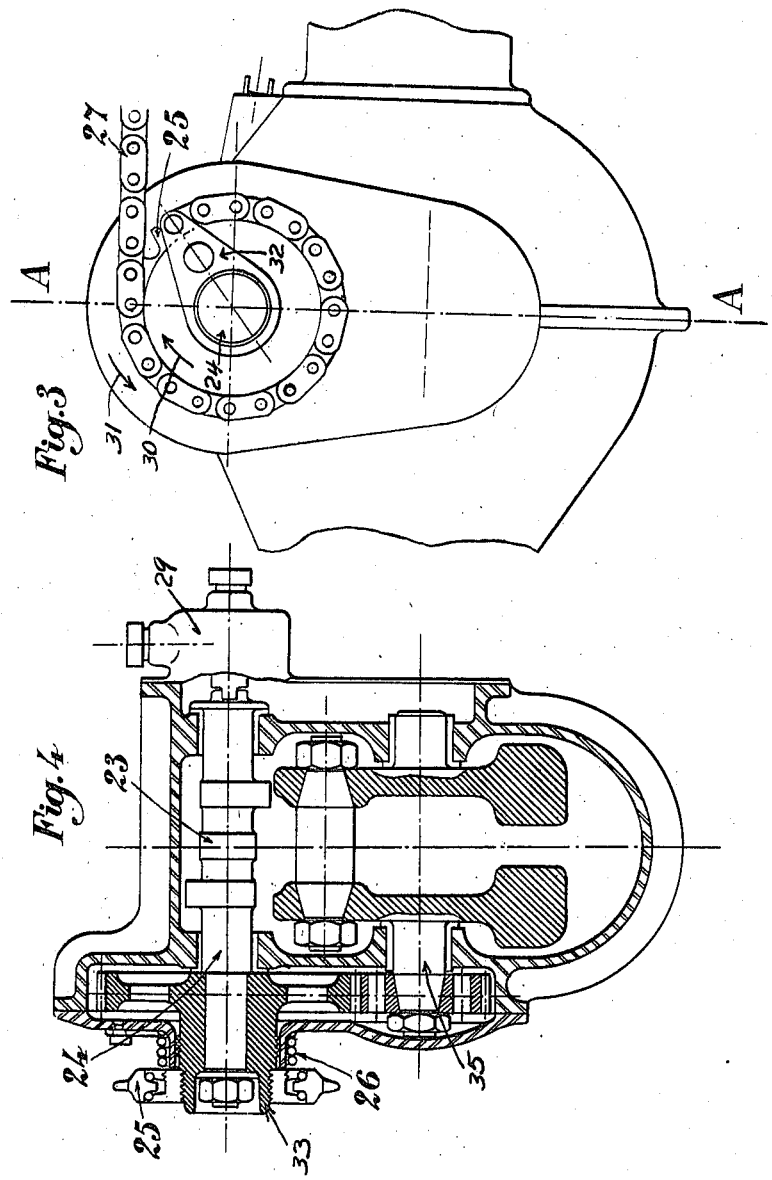
INVENTOR  
Marius Jean Baptiste  
Barbarou  
By  
his ATTORNEY.

Dec. 7, 1926.  
M. J. B. BARBAROU  
1,609,284  
STARTING APPARATUS FOR INTERNAL COMBUSTION ENGINES  
Filed Nov. 7, 1921 4 Sheets-Sheet 4
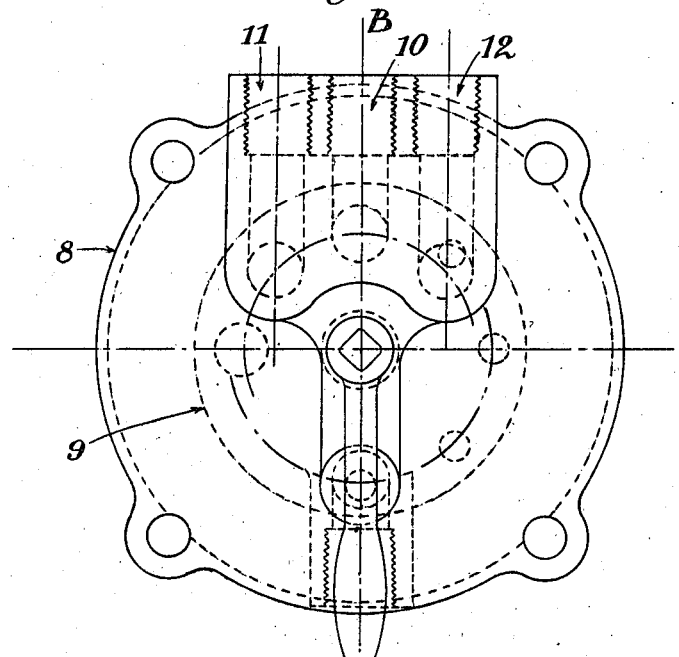
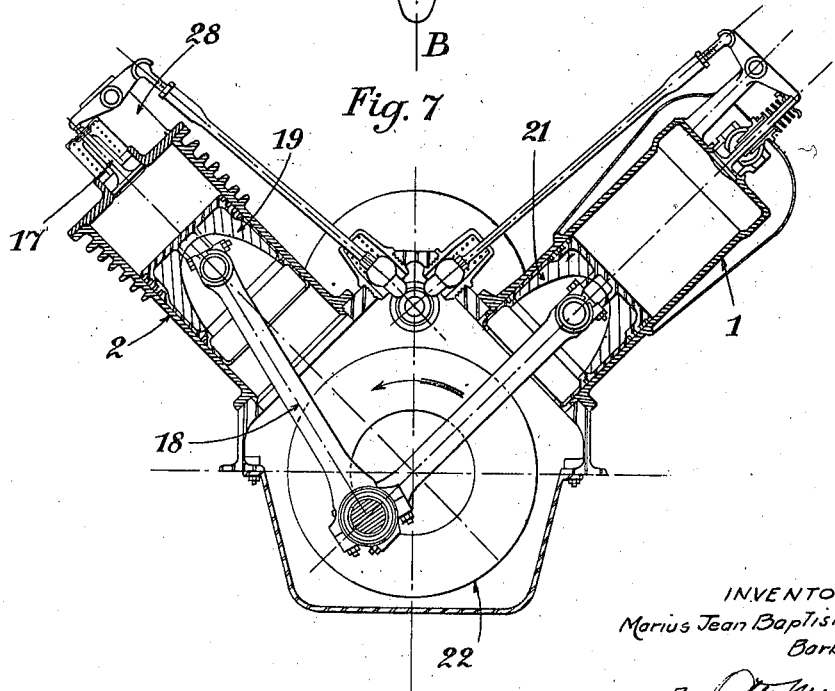
INVENTOR  
Marius Jean Baptiste  
Barbarou  
By  
his ATTORNEY.

Patented Dec. 7, 1926.

1,609,284

UNITED STATES PATENT OFFICE.

MARIUS JEAN BAPTISTE BARBAROU, OF PARIS, FRANCE.

STARTING APPARATUS FOR INTERNAL-COMBUSTION ENGINES.

Application filed November 7, 1921, Serial No. 513,277, and in France December 31, 1920.

The present invention relates to an improved device for obtaining compressed air in installations for starting high power aviation engines. According to the invention said starting device is of very small size; it requires only a very low power unit and it is easily started by hand.

The device is composed of a compressor group operating on gasoline. Said compressor group comprises a small air compressor which is driven directly by a small auxiliary gasoline engine of very low power. The air compressor supplies an air bottle or reservoir of some 30 litres.

In order to start the engine, the air reservoir is connected to the engine. The air reservoir has an equalizing effect and permits the starting of the internal combustion engine with a relatively small starting apparatus.

In case the aeroplane possesses several engines, a single starting group will suffice to start all the engines; for this purpose, the piping which leads from the air bottle is provided with a valve having several outlets corresponding to the several engines to be started.

In the accompanying drawing and by way of example:

Fig. 2 is a longitudinal section of the auxiliary engine and compressor group.

Fig. 3 is a side view of the starting device for the auxiliary engine.

Fig. 4 is a vertical section thereof on the line A—A (Fig. 3).

Fig. 5 is a side view of the valve sending the air into each of the cylinders of the engines to be started.

Fig. 7 shows a modified form of the compressor group.

Figure 1:
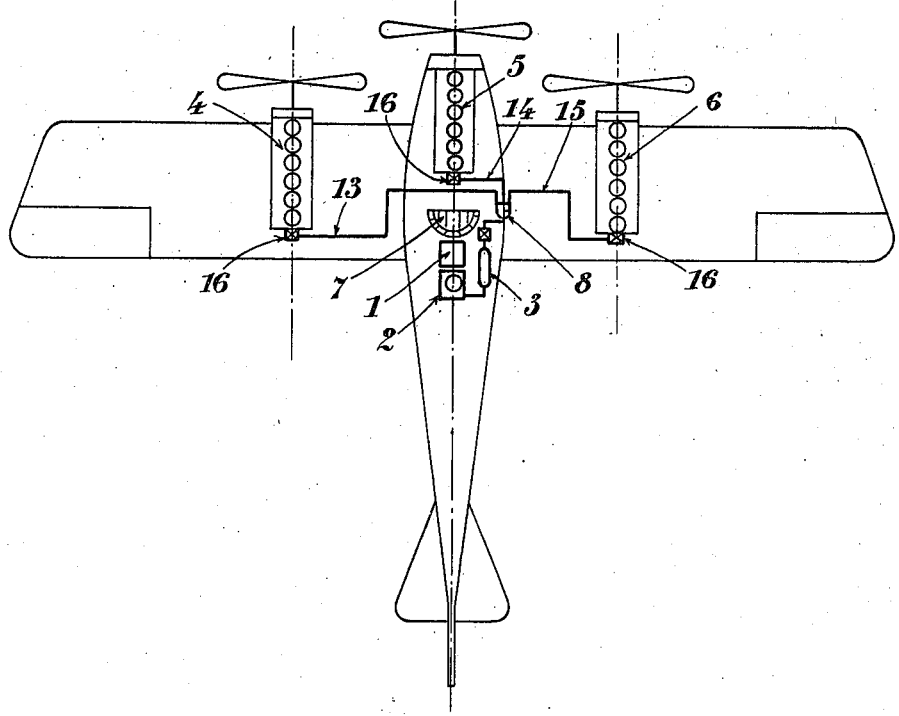
Fig. 1 is a plan view of an aeroplane provided with a device for starting its engines, according to the invention.

As shown in the drawing, the compressor group 1—2 which may have a very small power, supplies an air bottle or reservoir 3 which serves to equalize the pressure of the air delivered by said compressor group to the engine to be started.

By this means, it will be always possible to start the engines of the aeroplane, without having to fear any lack of gasoline by reason of the large capacity of the gasoline tank and the very small consumption of fuel of the internal combustion engine of the compressor.

The general arrangement upon the aeroplane may be quite variable; Fig. 1 represents a preferred disposition.

Assuming that the aeroplane has three engines 4, 5, 6, the central engine 5 being mounted in the main body which also serves for the pilot's place, the compressor is disposed in said main body within the reach of pilot.

Figure 6:
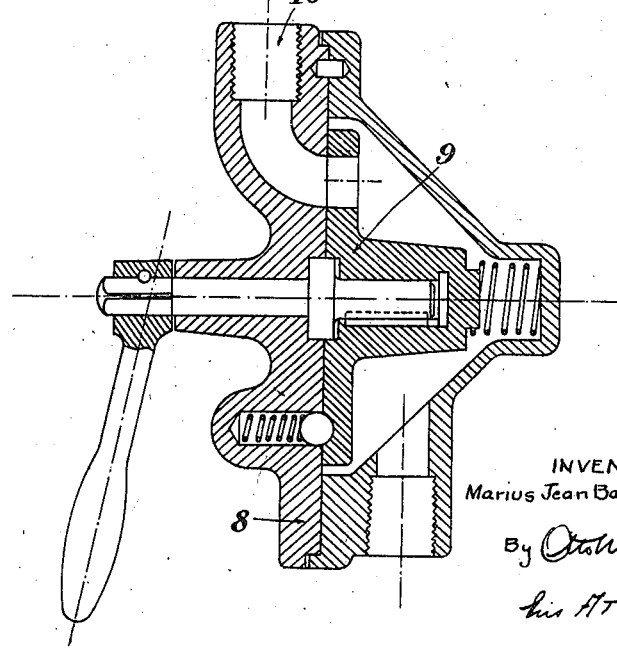
Fig. 6 is a section on the line B—B (Fig. 5).

The air compressed in the compressor 2 is sent to a bottle or reservoir 3 and then to the valve 8 (Figs. 1, 5, 6). This valve 8 comprises as many outlet orifices 10, 11, 12 as there are engines to be started. A rotary valve 9 may close the three orifices simultaneously or open any one of the three. Three pipes 13, 14, 15 (Fig. 1) connect the valve 8 with the distributor 16 of each engine respectively.

Said distributor rotates at the same speed as the cam shaft of the aeroplane engine upon which it is mounted and it feeds periodically the cylinder of this engine with compressed air, at times corresponding to the explosion and expansion periods.

The compressed air generator is itself constituted by a single cylinder four stroke internal combustion engine 1 of the usual type, and by a single cylinder air compressor 2. The engine and the compressor have a common crank shaft 35, the cranks of which have the shape of discs or fly wheels 22 for balancing the forces of inertia to which the connecting rods are subjected. The head of the connecting rod 34 of said internal combustion engine carries at a suitable point the pin 20 on which is pivoted the connecting rod 18 which drives the piston 19 of the air compressor 2. The pin 20 is situated in such a manner on the head of the connecting rod 18 that the said connecting rod 18 will pass through the dead point (i. e. at the beginning of the suction stroke of the air compressor) at the very moment when the engine piston (21) is in the position for which the exhaust of said engine begins. Due to this arrangement, the working period of the engine piston 21 lasts during the whole time of compression of the air, till the piston 19 comes to the end of its stroke. As the fly wheels 22 have not, during said exhaust period, to overcome the resistance opposed by the compressed air at the end of the compression or delivery stroke of the air compressor, as it would be the case if both connecting rods 18 and 34 were pivoted on the crank shaft in the ordinary manner, it is possible to only require from the fly wheels 22 the minimum amount of kinetic energy, this permitting to reduce the weight of said fly wheels.

To permit the single cylinder four stroke engine 1, to drive the compressor 2, in spite of its low power, the air suction valve 17 is closed only during the air compression stroke corresponding to the power stroke of the engine 1, i. e. to the explosion and expansion period of the latter. For this purpose, the cam 23 mounted on the common cam shaft 24 has a suitable profile. During the other three strokes of the engine 1, the air suction valve 17 remains open, so that the motor 1 may effect said three strokes without excessive reduction of the kinetic energy of the fly wheels 22. Hence due to this opening of said air suction valve 17 during three strokes out of four, it is possible to futher reduce the weight of said fly wheels.

A modified form of this device is represented in Fig. 7. The cylinders may also be disposed with their axes forming a V, the angle of this V being chosen in such manner as to improve the relative disposition of the connecting rods during the power stroke and the compression stroke.

The starting of this engine is carried out in the following manner:

Upon the common shaft 24 (Fig. 4) which carries the cams for the valve gear of the engine and compressor, and also carries the ignition distributor 29 of the engine 1, is mounted a free wheel or one-way driving wheel 25. The common cam shaft 24 turns normally in the direction shown by the arrow 30 (Fig. 4) and said wheel 25 is free to turn in the reverse direction shown by the arrow 31. Said free wheel 25 is always returned in the direction of the arrow 31 to a determined position by the return spring 26, one end of the latter being fixed on the crank case and the other end on the free wheel 25. A chain 27 has one of its ends secured between two teeth of the wheel 25 by means of an arm 32 loosely mounted on a hub (not shown in the drawing) screwed upon the screwed end 33 (Fig. 4) of the cam shaft 24.

To start the engine 1, the ignition circuit being switched in, a tractive effort is exerted upon the chain 27 (Fig. 3). This will cause the wheel 25 to rotate by one revolution and a half in the direction of the arrow 30. In its rotation, said wheel 25 draws along the common cam shaft 24 and the common crank shaft 35 of the engine 1 and the compressor 2, whereby said engine is started. On releasing the chain 27, the return spring 26 winds up the chain 27 by returning to its initial position shown in Fig. 3.

If the engine fails to start after the first traction exerted upon the chain 27, this operation is repeated until the engine is started. The large capacity of the general gasoline tank of the aeroplane, with respect to the very small consumption of the compressor engine, will ensure in every case the starting of said engine. In order to facilitate this starting, the compression chamber of the air compressor cylinder 2 is put in communication with the open air during the whole time of the starting until the compressor engine has reached its normal working; under these conditions, the engine 1 need not exert any effort for compressing the air during this period. For this purpose, a two way cock 40 is placed on the delivery pipe 28 of the air compressor, within the reach of the pilot. In one of its positions, this cock 40 connects the cylinder 2 of the air compressor with the air bottle 3 and, in another position, cuts off this communication and connects the cylinder 2 with the open air. The cock 40 being initially in the latter position, the compressor engine is started and then the pilot replaces the cock in the first position in order to compress air into said bottle 3.

Having now described my invention, what I claim as new and desire to secure by Letters Patent is:

1. In an installation for starting high power aviation engines an engine driven air compressor comprising a single cylinder air compressor, a single cylinder four stroke internal combustion engine, a common crank case for said air compressor and said internal combustion engine, a common crank shaft, a common cam shaft, a connecting rod for said air compressor, a connecting rod for said internal combustion engine, and a projection provided on the big end of said connecting rod for said combustion engine, said connecting rod for the air compressor being pivotally connected to said projection on the big end of said connecting rod for the internal combustion engine, the center of the connection of said projection with said connecting rod for the air compressor being out of the longitudinal axis of said connecting rod for the internal combustion engine.

2. In an installation for starting high power aviation engines an engine driven air compressing device comprising a single cylinder air compressor, a single cylinder four stroke internal combustion engine, a common crank case for said air compressor and said internal combustion engine, a common crank shaft and a common cam shaft, an air suction valve for said air compressor, a cam mounted upon said common cam shaft, means for operating said air suction valve by said cam, said valve being closed only during the delivery stroke of the air compressor corresponding to the power stroke of said internal combustion engine.

In testimony whereof I have signed my name to this specification.

MARIUS JEAN BAPTISTE BARBAROU.